(12) United States Patent
Inokuchi et al.

(10) Patent No.: US 7,531,992 B2
(45) Date of Patent: May 12, 2009

(54) CONTROL SYSTEM FOR CONTROLLING OUTPUT OF POWER GENERATOR

(75) Inventors: Takatoshi Inokuchi, Kariya (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/907,387

(22) Filed: Oct. 11, 2007

(65) Prior Publication Data

US 2008/0088282 A1     Apr. 17, 2008

(30) Foreign Application Priority Data

Oct. 16, 2006    (JP)    ............... 2006-281448

(51) Int. Cl.
*H20P 9/00*    (2006.01)
(52) U.S. Cl. ............... 322/28; 322/24; 322/25; 322/27; 322/54; 322/59
(58) Field of Classification Search .......... 322/28, 322/24, 25, 27, 29, 35, 45, 59
See application file for complete search history.

(56) References Cited

U.S. PATENT DOCUMENTS

| | | | |
|---|---|---|---|
| 4,603,675 A | 8/1986 | Junginger et al. | |
| 5,521,486 A | 5/1996 | Takamoto et al. | |
| 5,703,472 A | 12/1997 | Aoyama et al. | |
| 5,823,164 A | 10/1998 | Seki et al. | |
| 6,137,247 A | 10/2000 | Maehara et al. | |
| 6,900,618 B2* | 5/2005 | Maehara ............... | 322/28 |
| 7,183,750 B2 | 2/2007 | Asada | |
| 7,292,007 B2* | 11/2007 | Aoyama ............... | 322/24 |
| 7,368,982 B2* | 5/2008 | Chida ............... | 330/9 |
| 2006/0082347 A1 | 4/2006 | Asada | |

FOREIGN PATENT DOCUMENTS

| | | |
|---|---|---|
| DE | 35 10 173 A1 | 2/1986 |
| DE | 37 28 088 A1 | 3/1989 |
| DE | 39 21 329 A1 | 1/1991 |
| DE | 44 45 814 A1 | 6/1995 |
| DE | 10 2005 048 699 A1 | 5/2006 |
| EP | 0 725 473 A2 | 8/1996 |
| JP | A 08-079981 | 3/1996 |
| JP | A 09-019080 | 1/1997 |
| JP | A 2006-115619 | 4/2006 |

* cited by examiner

*Primary Examiner*—Nicholas Ponomarenko
*Assistant Examiner*—Iraj A Mohandesi
(74) *Attorney, Agent, or Firm*—Oliff & Berridge, PLC

(57) ABSTRACT

In a control system for controlling a power generator based on a command value associated with a control parameter, a receiver receives the command signal, a detector detects the command value included in the received command signal, and a determiner determines whether a duration of the detected command value being invariant within a predetermined range exceeds a predetermined allowed duration. In the control system, a controller controls an output of the power-generator based on a predetermined default value within the predetermined range in place of the command value when it is determined that the duration of the detected command value being invariant within the predetermined range exceeds the predetermined allowed duration.

8 Claims, 5 Drawing Sheets

CONTROL SYSTEM FOR CONTROLLING OUTPUT OF POWER GENERATOR

CROSS REFERENCE TO RELATED APPLICATIONS

This application is based on Japanese Patent Application No. 2006-281448 filed on Oct. 16, 2006. The descriptions of the Patent Application are all incorporated herein by reference.

FIELD OF THE INVENTION

The present invention relates to control systems for controlling an output of a power generator based on a command signal sent from an external unit.

BACKGROUND OF THE INVENTION

In conventional power-generation control systems for motor vehicles, an IC regulator is operative to adjust an output voltage of an engine-driven alternator to a target voltage. The adjusted output voltage is supplied to a battery and vehicle electrical loads. The target voltage is determined depending on the operating conditions of the engine and/or various power requirements of the vehicle electrical loads.

When a battery voltage is changed to be unmatched with the target voltage, a corrected value is supplied from an engine ECU (Electronic Control Unit) to the IC regulator so that the corrected value is added to the target voltage so as to match the target voltage with the battery voltage.

In the alternator voltage control set forth above, in order to find faults of the power-generation control system, an example of malfunction determining methods is disclosed in Japanese Unexamined Patent Publication H08-079981.

The method disclosed in the JP Unexamined Patent Publication is designed to monitor the corrected value to be supplied from the engine ECU to the IC regulator and to determine that any failure occurs in a power-generation control system when the monitored corrected value exceeds a predetermined threshold value.

Specifically, the conventional method set forth above continuously compares the target voltage with an actual output voltage of the alternator, calculates the corrected value for the target voltage based on the comparison result, and monitors the calculated corrected value.

In conventional IC regulators, an example of malfunction determining methods is disclosed in U.S. Pat. No. 5,703,472 corresponding to Japanese Unexamined Patent Publication No. H09-019080.

In the method disclosed in the US Patent Publication, a voltage of a communication terminal of an IC regulator connected with an outside control unit, such as an ECU, via a communication line is set to a predetermined voltage. A voltage of a signal to be input to the communication terminal of the IC regulator is monitored, and the monitored voltage is compared with a specific voltage range.

When the monitored voltage is out of the specific voltage range, it is possible to determine that at least one of abnormalities occurs in the communication line; these abnormalities include a break or a short in the communication line and a short of the communication line to a positive or negative terminal of a battery. This makes it possible to control an output voltage of an alternator to thereby protect the battery and/or electrical loads connected with the battery.

In addition, U.S. Pat. No. 7,183,750 B2 corresponding to Japanese Unexamined Patent Publication No. 2006-115619 discloses a method of maintaining proper power-generation control even if a wrong command signal specifying a target voltage is input to an IC regulator.

Specifically, in the method disclosed in the U.S. Pat. No. 7,183,750 B2, an output voltage of an engine-driven alternator is monitored whether it lies within a predetermined proper range. When it is monitored that the alternator output voltage becomes out of the predetermined proper range based on the monitor result, it is determined that the command signal specifying the target voltage becomes wrong. At the time of the wrong target-voltage determination, a preset target voltage maintained within the predetermined voltage range is used to adjust the alternator output voltage.

SUMMARY OF THE INVENTION

However, in the method disclosed in the JP Unexamined Patent Publication No. H08-079981, the occurrence of failures in a power-generation control system associated with the monitored corrected value can be detected. However, the JP Unexamined Patent Publication does not disclose, in the event of a failure of the power-generation control system, how to get a handle on the failure. This may make it difficult to stably control the output of the power-generation control system.

In this respect, in the method disclosed in the U.S. Pat. No. 7,183,750 B2, when the command signal specifying a target voltage becomes wrong so that the alternator output voltage becomes out of a predetermined voltage range, it is possible to get a handle on the wrong command signal using a preset target voltage.

However, in the method disclosed in the U.S. Pat. No. 7,183,750 B2, when an abnormality in that the command signal specifying a target voltage becomes wrong while the alternator output voltage lies within the predetermined proper range occurs, it may be difficult to detect the occurred abnormality.

In view of the background, an object of at least one aspect of the present invention is to detect a wrong command signal specifying a target value for an output of a power-generator even if an output of the power-generator lies within a predetermined range and to get a handle on the detected wrong command signal.

According to one aspect of the present invention, there is provided a control system for controlling a power generator based on a command value associated with a control parameter. The command value is changed over time and included in a command signal externally sent to the control system. The control system includes a receiver that receives the command signal, a detector that detects the command value included in the received command signal, and a determiner that determines whether a duration of the detected command value being invariant within a predetermined range exceeds a predetermined allowed duration. The control system includes a controller that controls an output of the power-generator based on a predetermined default value within the predetermined range in place of the command value when it is determined that the duration of the detected command value being invariant within the predetermined range exceeds the predetermined allowed duration.

According to another aspect of the present invention, there is provided a control system installed in a motor vehicle for controlling a power generator based on a command value associated with a control parameter. The command value depends on change in an operating condition of the motor vehicle and included in a command signal externally sent to the control system. The control system includes a first detector that detects the operating condition of the motor vehicle, a receiver that receives the command signal, and a second detector that detects the command value included in the received command signal. The control system includes a storage unit that has stored therein information, the information representing a relationship between a variable of the command value depending on the change in the operating condition of the motor vehicle and a variable of a predetermined allowed duration. The control system includes a determiner to determine whether a failure occurs in the command signal based on the operating condition of the motor vehicle and the information stored in the storage unit.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
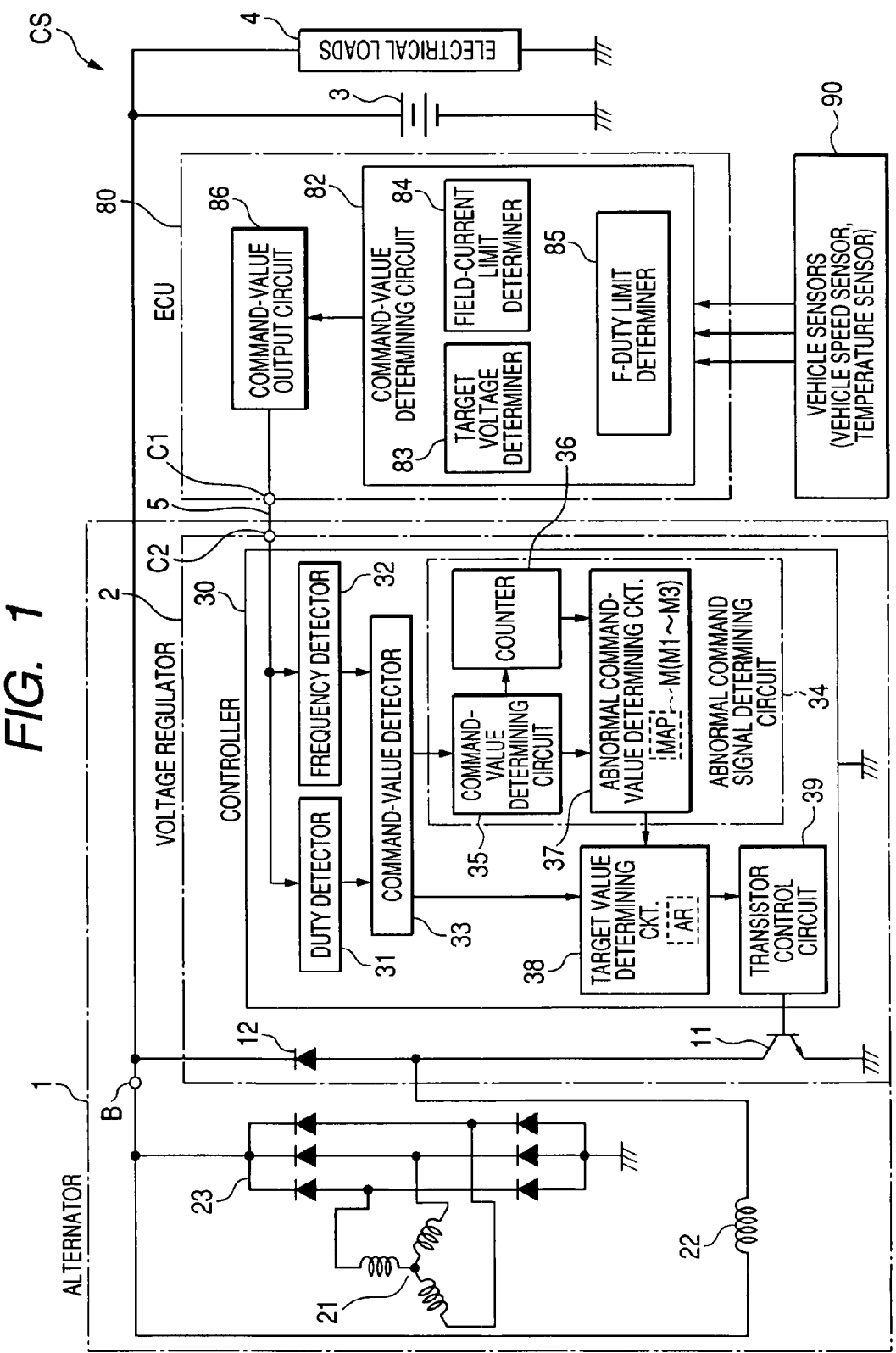
FIG. 1 is a circuit diagram schematically illustrating an example of the structure of a power-generation control system including an alternator and an electronic control unit (ECU) according to an embodiment of the present invention.

Referring to FIG. 1, there is provided a power-generation control system CS installed in a motor vehicle according to an embodiment of the present invention.

The power-generation control system includes an alternator 1 as an example of power-generators, which includes a voltage regulator 2 designed as, for example, at least one analog or digital IC, or at least one digital-analog IC. The power-generation control system also includes an electronic control unit (ECU) 80 as an example of external units, and a battery 3.

The alternator 1 has a terminal B. A positive terminal of the battery 3 and other electrical loads 4 installed in the vehicle are connected with the terminal B of the alternator 1. The terminal B of the alternator 1 serves as an output terminal thereof.

In the embodiment, the positive terminal voltage of the battery 3 is about 12V when the battery 3 is fully charged.

The ECU 80 has a communication terminal C1, and the communication terminal C1 of the ECU 80 and a communication terminal C2 of the voltage regulator 2 are communicably coupled to each other via a communication bus 5.

The voltage regulator 2 is provided with a signal common (signal ground) thereof. A terminal E of the regulator 2 is connected with the ground terminal E of the alternator 1.

The alternator 1 is equipped with a field winding (exciting winding) 22 wound around a core of a rotor to create field poles (north and south poles) alternately arranged when energized. The rotor is coupled to a crankshaft of an engine through a belt or the like to be rotatable therewith.

The alternator 1 is provided with three-phase stator windings 21 connected in, for example, star or delta configuration and wound around a stator core that surrounds the rotor.

The alternator 1 is provided with a rectifier 23 consisting of, for example, three pairs of positive (high-side) and negative (low-side) diodes connected in the form of a bridge. Specifically, the positive and negative diodes of each pair are connected in series at a connection point, and the connection points of the three-paired diodes are connected with lead wires of the three-phase stator windings 21, respectively.

The cathodes of the high-side diodes are commonly connected with the output terminal B of the alternator 1, and the anodes of the low-side diodes are commonly connected with a ground terminal of the alternator 1.

One end of the exciting winding 22 is connected with the cathodes of the high-side diodes, and the other end thereof is connected with a connection point between an anode of a flywheel diode 12 and a collector of a power transistor 11 of the voltage regulator 2, which will be described hereinafter.

In the alternator 1, when the field winding 22 is energized while the rotor rotates, the rotating field winding 21 creates magnetic fluxes. The created magnetic fluxes magnetize the core to provide the field poles.

The rotation of the filed poles creates magnetic fluxes, and the created magnetic fluxes induce a three-phase AC voltage in the three-phase stator windings 21. The rectifier 23 full-wave rectifies the induced three-phase AC voltage induced in the stator windings 21 to a direct current (DC) voltage. The full-wave rectified DC voltage is output through the output terminal B of the alternator 1 so that the output DC voltage is supplied to the battery 3 and the electrical loads 4.

The output DC voltage of the alternator 1 depends on the number of rotation of the rotor and the amount of the field current to be supplied to the field winding 22.

Thus, the voltage regulator 2 is operative to control the field current to be supplied to the field winding 22.

Specifically, the voltage regulator 2 includes the power transistor 11, the flywheel diode 12, and a controller 30.

The power transistor 11 serves as an example of power switches, for example, as the power transistor 11, an NPN transistor is used.

Specifically, the base and emitter of the power transistor 11 are connected with the controller 30, and the collector thereof is connected with the output terminal B of the alternator 1 through the flywheel diode 12. The emitter of the power transistor 11 is connected with a ground terminal of the alternator 1 to be grounded. The collector of the power transistor 11 is also connected with the other end of the field winding 22.

The flywheel diode 12 is connected at its cathode with the output terminal B of the alternator 1 and at its anode with the collector of the power transistor 11 to be parallel to the field current 11.

Specifically, when the power transistor 11 becomes on, a field current flows through the filed winding 22 based on the voltage at the output terminal B of the alternator 1. In contrast, when the power transistor 11 becomes off, the field current continues to flow through the flywheel diode 12.

The ECU 80 is designed as, for example, a microcomputer system. A plurality of vehicle sensors 90 including a vehicle speed sensor and a temperature sensor, which are installed in advance in the motor vehicle, are connected with the ECU 80 and operative to measure various physical quantities associated with operating conditions of the motor vehicle.

The vehicle speed sensor is disposed, for example, close to the crankshaft of the engine or a transmission of the motor vehicle. The vehicle speed sensor is operative to periodically measure the speed of the motor vehicle as one of the physical quantity associated with the operating conditions of the motor vehicle, and to periodically sent, to the ECU 80, an electrical measurement signal indicative of the measured speed of the motor vehicle.

For example, the temperature sensor is disposed at a predetermined measurement point, such as a point close to the rectifier 23 or stator windings 21, located in the alternator 1. The temperature sensor is operative to periodically measure the temperature at the predetermined measurement point, and to periodically sent, to the ECU 80, an electrical measurement signal indicative of the measured temperature.

The ECU 80 functionally includes a command-value determining circuit 82 and a command-signal output circuit 86.

The command-value determining circuit 82 consists of a target-voltage determiner 83, a field-current limit determiner 84, and an F-duty limit determiner 85.

Every time the measurement signals are sent from the vehicle sensors 90 in a cycle, the target-voltage determiner 83 is operative to determine, based on the measurement signals for each cycle, a command value for a first control parameter in a plurality of control parameters required to control the alternator output.

The field-current limit determiner 84 is operative to determine, based on the measurement signals for each cycle, a command value for a second control parameter in the plurality of control parameters.

The F-duty limit determiner 85 is operative to determine, based on the measurement signals for each cycle, a command value for a third control parameter in the plurality of control parameters.

Note that, for example, the plurality of control parameters include, as the first control parameter, a target voltage for the alternator output voltage. Similarly, the plurality of control parameters include, as the second and third control parameters, a lower limit of duration of the field current to flow through the field winding 22 and a lower limit of duty cycle of a power-transistor drive signal, respectively. The power-transistor drive signal consists of a pulse train with a predetermined duty cycle and a predetermined frequency.

Under the circumstances set forth above, the command value to be determined by the target-voltage determiner 83 will be referred to as "target-voltage command value" hereinafter, and the command value to be determined by the field-current limit determiner 84 will be referred to as "field-current command value" hereinafter. Similarly, the command value to be determined by the F-duty limit determiner 85 will be referred to as "duty command value" hereinafter.

The command-value output circuit 86 is operatively connected with the command-value determining circuit 82.

The command-value output circuit 86 works to cyclically generate, as a command signal, a PWM (Pulse Width Modulation) signal consisting of a pulse train with a predetermined duty cycle and a predetermined frequency by:

pulse-width modulating a pulse train according to, as the first command value, one of the "target-voltage command value", "field-current command value", and the "duty command value", which are cyclically determined by the respective determiners 83, 84, and 85; and frequency modulating the pulse train according to another one of the "target-voltage command value", "field-current command value", and the "duty command value", which are cyclically determined by the respective determiners 83, 84, and 85.

The controller 30 of the voltage regulator 2 is designed as a programmed logic circuit, such as a microcomputer. The controller 30 can be designed as a wired logic circuit.

Specifically, the controller 30 functionally consists of a duty detector 31, a frequency detector 32, a command-value detector 33, an abnormal command signal determining circuit 34, a target value determining circuit 38, and a transistor control circuit 39.

The duty detector 31 is connected with the command-value detector 33 and with the ECU 80 via the communication bus 5.

The duty detector 31 is operative to receive the command signal (the PWM signal) sent from the ECU 80 via the communication bus 5, to detect the predetermined duty cycle of the PWM signal, and to feed the detected duty cycle to the command-value detector 33.

Similarly, the frequency detector 32 is connected with the command-value detector 33 and with the ECU 80 via the communication bus 5. The frequency detector 32 is operative to receive the PWM signal sent from the ECU 80 via the communication bus 5, to detect the predetermined frequency of the PWM signal, and to feed the detected frequency to the command-value detector 33.

The command-value detector 33 is operative to receive the predetermined duty cycle and the predetermined frequency of the PWM signal fed from the duty and frequency detectors 31 and 32, respectively.

The command-value detector 33 is operative to detect the first command value associated with one of the plurality of control parameters required to control the alternator output based on the duty cycle detected by the duty detector 31. Similarly, the command-value detector 33 is operative to detect the second command value associated with another one of the plurality of control parameters required to control the alternator output based on the frequency detected by the frequency detector 32.

The command-value detector 33 is operative to feed the detected command values to the abnormal command signal determining circuit 34.

The abnormal command signal determining circuit 34 is operative to determine whether the first and second command signals are abnormal.

Specifically, the abnormal command signal determining circuit 34 functionally consists of a command-value determining circuit 35, a counter 36, and an abnormal command-value determining-circuit 37.

The command-value determining circuit 35 is operatively connected with the command-value detector 33, the counter 36, and the abnormal command-value determining circuit 37. The command-value determining circuit 35 is operative to determine whether each of the first and second command values detected by the command-value detector 33 lies within a corresponding proper range determined in advance.

The counter 36 is operatively connected with the abnormal command-value determining circuit 37. The counter 36 works to measure, when it is determined that the detected first command value lies within the corresponding proper range, the duration of the same first command value being invariantly received by the command-value detector 33. Similarly, the counter 36 works to measure, when it is determined that the detected second command value lies within the corresponding proper range, the duration of the same second command value being invariantly received by the command-value detector 33.

The abnormal command-value determining circuit 37 is operatively connected with the target value determining circuit 38.

The abnormal command-value determining circuit 37 has stored therein various maps M. Each of the maps M is composed of, for example, a data table and/or a program.

For example, a first map M1 of the maps M represents a relationship between a variable indicative of the target-voltage command value and that indicative of a measured duration corresponding to the target-voltage command value.

A second map M2 of the maps M represents a relationship between a variable indicative of the field-current command value and that indicative of a measured duration corresponding to the field-current command value.

A third map M3 of the maps M represents a relationship between a variable indicative of the duty command value and that indicative of a measured duration corresponding to the duty command value.

The abnormal command-value determining circuit 37 works to determine that at least one of the first and second command values is abnormal when it is determined that at least one of the first and second command values is out of the corresponding proper range by the command-value determining circuit 35.

The abnormal command-value determining circuit 37 also works to:

when it is determined that at least one of the first and second command values lies within the corresponding proper range by the command-value determining circuit 35, reference a corresponding one of the first to third maps M1 to M3 using the at least one of the first and second command values to determine an allowable duration of invariant command-value corresponding to the at least one of the first and second command values; and determine that the at least one of the first and second command values is abnormal when it is determined that the measured value by the counter 36 reaches the determined allowable duration of invariant command-value corresponding to the at least one of the first and second command values.

The target value determining circuit 38 has a storage area AR in which a plurality of default values respectively associated with the plurality of control parameters required to control the alternator output have been stored.

The target value determining circuit 38 is operative to:

when it is determined that each of the first and second command values is normal by the abnormal command-value determining circuit 37 (no failures are detected in each of the first and second command values), determine, as first and second target values, the first and second command values; and pass the first and second target values to the transistor control circuit 39.

The first and second target values are respectively associated with corresponding first and second control parameters in the plurality of control parameters required to control the alternator output.

Note that a proper range of the target voltage for the alternator output voltage is previously determined so that, when the first or second command value is set as the first control parameter, it can be set within the predetermined proper range. Similarly, a proper range of the duration of the field current is previously determined so that, when the first or second command value is set as the second control parameter, it can be set within the predetermined proper range. Furthermore, a proper range of the duty cycle of the power-transistor drive signal is previously determined so that, when the first or second command value is set as the third control parameter, it can be set within the predetermined proper range.

The target value determining circuit 38 is also operative to:

when it is determined that, for example, the first command value is abnormal by the abnormal command-value determining circuit 37 (a failure is detected in the first command value), reference to the storage area AR to read out one default value corresponding to the first command value in the plurality of default values therefrom;

pass, as the first target value, the readout one default value to the transistor control circuit 39;

determine, as the second target value, the second command value; and pass the second target value to the transistor control circuit 39.

An output terminal of the transistor control circuit 39 is connected with the base of the power transistor 11, the emitter of the power transistor 11 is connected with the transistor control circuit 39. The output terminal B of the alternator 1 is connected with the transistor control circuit 39.

The transistor control circuit 39 is operative to:

detect the alternator output voltage at the output terminal B;

detect the magnitude of the field current flowing through the emitter of the power transistor 11;

receive the target values passed by the target value determining circuit 38; and drive the power transistor 11 based on the received target values, based on the detected alternator output voltage at the output terminal B, and based on the detected magnitude of the field current flowing through the emitter of the power transistor 11.

Specifically, one of the target values passed by the target determining circuit 38 represents the target voltage, the transistor control circuit 39 supplies a drive signal (PWM drive signal) to the base of the power transistor 11. The PWM drive signal allows the power transistor 11 to be switched on and off based on the duty cycle of the PWM drive signal, thus controlling duration of the field current being fed to the field winding 11. The control of the duration of the field current being fed to the field winding 11 allows the output voltage of the alternator 1 to be regulated to the target voltage within the corresponding proper range.

When one of the target values passed by the target determining circuit 38 represents the lower limit of the duration of the field current, the transistor control circuit 39 controls the duration of the field current being fed to the field winding 11 to be equal to or higher than the lower limit within the corresponding proper range.

When one of the target values passed by the target determining circuit 38 represents the lower limit of the duty cycle of the PWM drive signal, the transistor control circuit 39 supplies the PWM drive signal to the base of the power transistor 11 while the duty cycle thereof is equal to or higher than the lower limit within the corresponding proper range.

Figure 2:
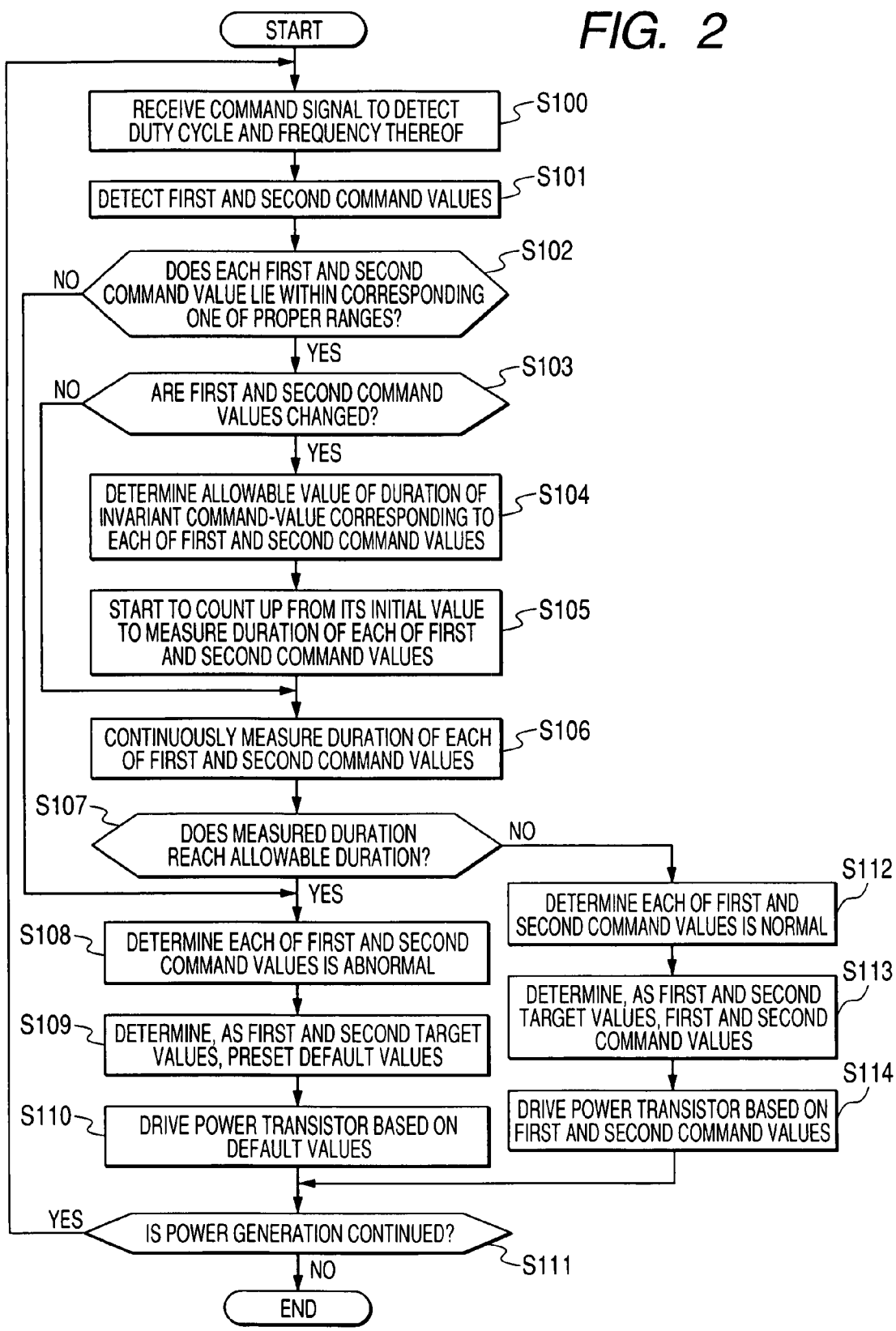
FIG. 2 is a flowchart schematically illustrating an example of operation to be executed by a voltage regulator of the alternator illustrated in FIG. 1.

Next, overall operations of the voltage regulator 2 will be described hereinafter with reference to FIG. 2. FIG. 2 represents the procedure of operations to be executed by the voltage regulator 2 when the command signal sent from the ECU 80 is received thereby. If the voltage regulator 2 is designed as at least one digital IC, the procedure of operations illustrated in FIG. 2 can be executed by the voltage regulator 2 in accordance with at least one program stored therein.

When the command signal (PWM signal) is cyclically sent from the ECU 80 via the communication bus 5, the duty detector 31 and the frequency detector 32 of the voltage regulator 2 receive the command signal cyclically sent from the ECU 80. Then, in step S100, the duty detector 31 detects the duty cycle of the cyclically received command signal, and the frequency detector 32 detects the frequency of the cyclically received command signal for each cycle.

In step S101, the command-value detector 33 detects the first command value associated with one of the first, second, and third control parameters based on the duty cycle cyclically detected by the duty detector 31. In step S101, the command-value detector 33 also detects the second command value associated with another one of the first, second, and third control parameters based on the frequency cyclically detected by the frequency detector 32 for each cycle.

In step S102, the command-value determining circuit 35 of the abnormal command signal determining circuit 34 determines whether each of the first and second command values cyclically detected by the command-value detector 33 lies within a corresponding one of the previously determined proper ranges.

When it is determined that each of the first and second command values cyclically detected by the command-value detector 33 lies within a corresponding one of the previously determined proper range (the determination in step S102 is affirmative), the voltage-regulator's execution is shifted to step S103. Otherwise, when it is determined that each of the first and second command values cyclically detected by the command-value detector 33 is out of a corresponding one of the previously determined proper range (the determination in step S102 is negative), the voltage-regulator's execution is shifted to step S108.

In step S103, the command-value detector 33 determines whether each of the first and second command values currently detected thereby is changed from a corresponding one of first and second command values previous to the currently detected first and second command values.

When it is determined that each of the first and second command values currently detected thereby is changed from a corresponding one of the previous first and second command values (the determination in step S103 is YES), the voltage-regulator's execution is shifted to step S104.

In step S104, the abnormal command-value determining circuit 37 reference a corresponding one of the first to third maps M1 to M3 using each of the first and second command values to determine an allowable duration of invariant command-value corresponding to each of the first and second command values.

In step S105, the counter 36 starts to count up from its initial value, such as zero to measure the duration of each of the first and second command values being invariantly received by the command-value detector 33 to thereby continuously measure the duration of each of the first and second command values in step S106.

Otherwise, when it is determined that each of the first and second command values currently detected thereby is kept unchanged from a corresponding one of the previous first and second command values (the determination in step S103 is NO), the voltage-regulator's execution is shifted to step S106 so that the continuous count operation of the counter 36 is maintained.

Next, in step S107, the abnormal command-value determining circuit 37 determines whether the measured duration by the counter 36 reaches the determined allowable duration corresponding to each of the first and second command values.

Figure 3:
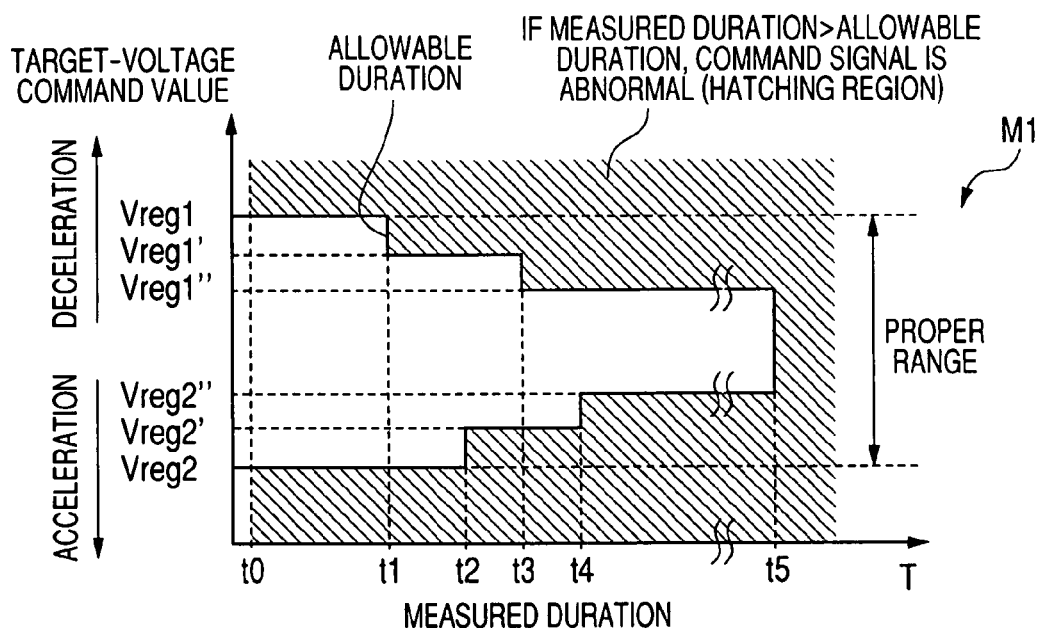
FIG. 3 is a view schematically illustrating a first map representing a relationship between a variable indicative of a target-voltage command value and that indicative of a measured duration corresponding to the target-voltage command value according to the embodiment.

For example, FIG. 3 schematically illustrates the first map M1 representing the relationship between the variable indicative of the target-voltage command value within the proper range and that indicative of a measured duration corresponding to the target-voltage command value.

For example, it is assumed that the first command value is the target-voltage command value.

In this assumption, as illustrated in FIG. 3, the target-voltage command value is increased from a voltage value Vreg1" toward the highest voltage value Vreg1 corresponding to the higher limit of the proper range via a voltage value Vreg1' with deceleration of the vehicle speed measured by the vehicle speed sensor. The increase in the target-voltage command value in response to deceleration of the vehicle speed allows regenerative power during deceleration to be recovered in order to charge the battery 3.

In this assumption, as illustrated in FIG. 3, the target-voltage command value is decreased from a voltage value Vreg2" toward the lowest voltage value Vreg2 corresponding to the lower limit of the proper range via a voltage value Vreg2' with acceleration of the vehicle speed measured by the vehicle speed sensor. The decrease in the target-voltage command value in response to acceleration of the vehicle speed allows torque used to generate power by the alternator 1 to be reduced in order to increase power to be supplied to the electrical loads 4.

In FIG. 3, the allowable duration has been determined depending on the variable of the target-voltage command value. The allowable duration partitions the region defined by the variable of the measured duration into an abnormal region (hatching region) and a normal region (non-hatching region).

Specifically, as illustrated in FIG. 3, when the measured duration T of the target-voltage command value of Vreg2' being invariantly received by the command-value detector 33 exceeds the corresponding allowable duration of t2 so that the measured duration T lies within the hatching region, the target-voltage command value of Vreg2' is determined to be abnormal even if it lies within the proper range.

Similarly, as illustrated in FIG. 3, when the measured duration T of the target-voltage command value of Vreg1' being invariantly received by the command-value detector 33 exceeds the corresponding allowable duration of t3 so that the measured duration T lies within the hatching region, the target-voltage command value of Vreg1' is determined to be abnormal even if it lies within the proper range.

Figure 4:
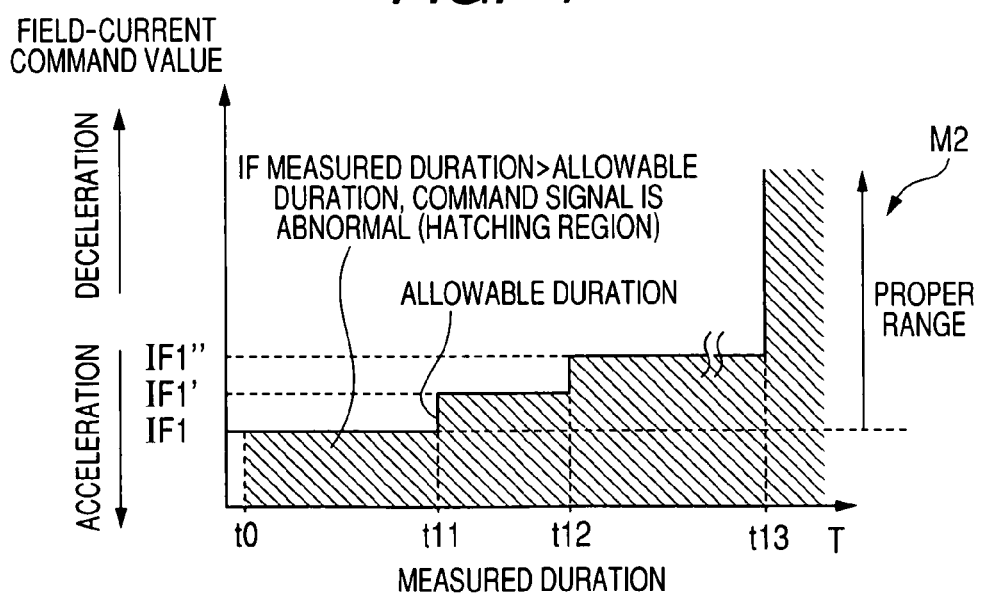
FIG. 4 is a view schematically illustrating a second map representing a relationship between a variable indicative of a field-current command value and that indicative of a measured duration corresponding to the field-current command value according to the embodiment.

FIG. 4 schematically illustrates the second map M2 representing the relationship between the variable indicative of the field-current command value within the proper range and that indicative of a measured duration corresponding to the field-current command value.

For example, it is assumed that the first command value is the field-current command value.

In this assumption, as illustrated in FIG. 4, the field-current command value is decreased from a current value IF1' toward the lowest current value IF1 corresponding to the lower limit of the proper range via a current value IF1' with acceleration of the vehicle speed measured by the vehicle speed sensor.

The decrease in the field-current command value in response to acceleration of the vehicle speed allows torque used to generate power by the alternator 1 to be reduced in order to increase power to be supplied to the electrical loads 4.

In FIG. 4, the allowable duration has been determined depending on the variable of the field-current command value. The allowable duration partitions the region defined by the variable of the measured duration into an abnormal region (hatching region) and a normal region (non-hatching region).

Specifically, as illustrated in FIG. 4, when the measured duration T of the field-current command value of IF1' being invariantly received by the command-value detector 33 exceeds the corresponding allowable duration of t11 so that the measured duration T lies within the hatching region, the field-current command value of IF1' is determined to be abnormal even if it lies within the proper range.

Figure 5:
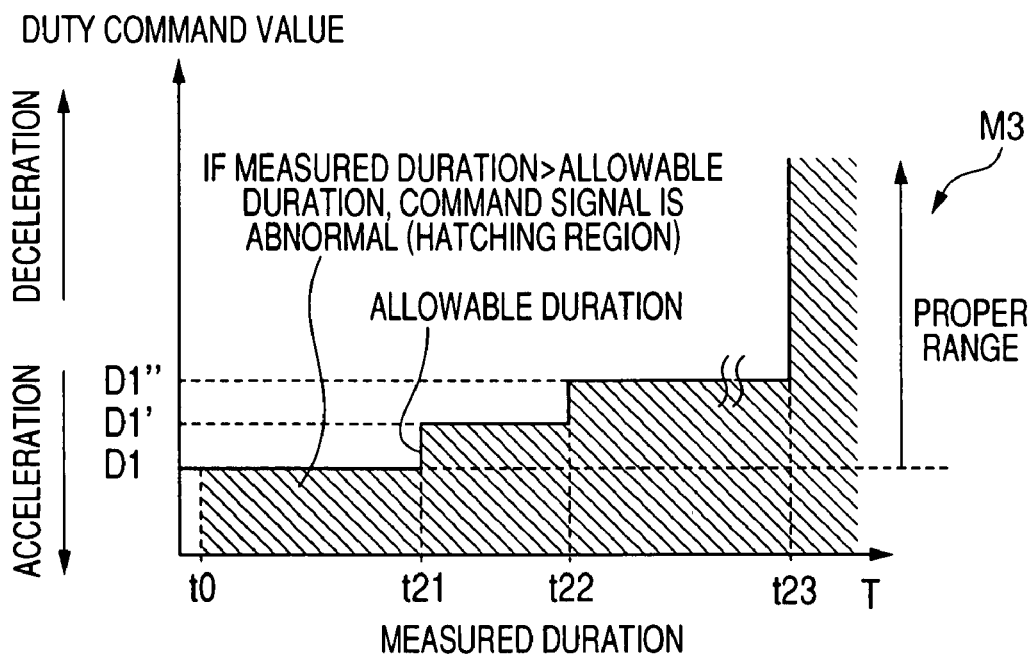
FIG. 5 is a view schematically illustrating a third map representing a third map representing a relationship between a variable indicative of a duty command value and that indicative of a measured duration corresponding to the duty command value according to the embodiment.

FIG. 5 schematically illustrates the third map M3 representing the relationship between the variable indicative of the duty command value within the proper range and that indicative of a measured duration corresponding to the duty command value.

For example, it is assumed that the first command value is the duty command value.

In this assumption, as illustrated in FIG. 5, the duty command value is decreased from a duty cycle D1" toward the lowest duty cycle D1 corresponding to the lower limit of the proper range via a duty cycle D1' with acceleration of the vehicle speed measured by the vehicle speed sensor. The decrease in the duty command value in response to acceleration of the vehicle speed allows torque used to generate power by the alternator 1 to be reduced in order to increase power to be supplied to the electrical loads 4.

In FIG. 5, the allowable duration has been determined depending on the variable of the duty command value. The allowable duration partitions the region defined by the variable of the measured duration into an abnormal region (hatching region) and a normal region (non-hatching region).

Specifically, as illustrated in FIG. 5, when the measured duration T of the duty command value of D1' being invariantly received by the command-value detector 33 exceeds the corresponding allowable duration of t21 so that the measured duration T lies within the hatching region, the duty command value of D1' is determined to be abnormal even if it lies within the proper range.

As set forth above, when it is determined that the measured duration by the counter 36 reaches the determined allowable duration corresponding to each of the first and second command values (the determination in step S107 is YES), the voltage-regulator's execution proceeds to step S108.

In step S108, the abnormal command-value determining circuit 37 determines that each of the first and second command values is abnormal.

Depending on the abnormal determination, the target value determining circuit 38 references to the storage area AR to read out one default value corresponding to each of the first and second command values in the plurality of default values therefrom, thus determining, as the first and second target values, the readout default values respectively corresponding to the first and second command values in step S109.

For example, as illustrated in FIG. 3, the default value corresponding to the target-voltage command value has been determined within the corresponding proper range. Similarly, as illustrated in FIGS. 4 and 5, the default values corresponding to the field-current command value and the duty command value have been determined within the corresponding proper ranges, respectively.

Next, in step S110, the transistor control circuit 39 drives the power transistor 11 to control the alternator output voltage based on the default values as the first and second target values, based on the detected alternator output voltage at the output terminal B, and based on the detected magnitude of the field current flowing through the emitter of the power transistor 11.

Figure 6:
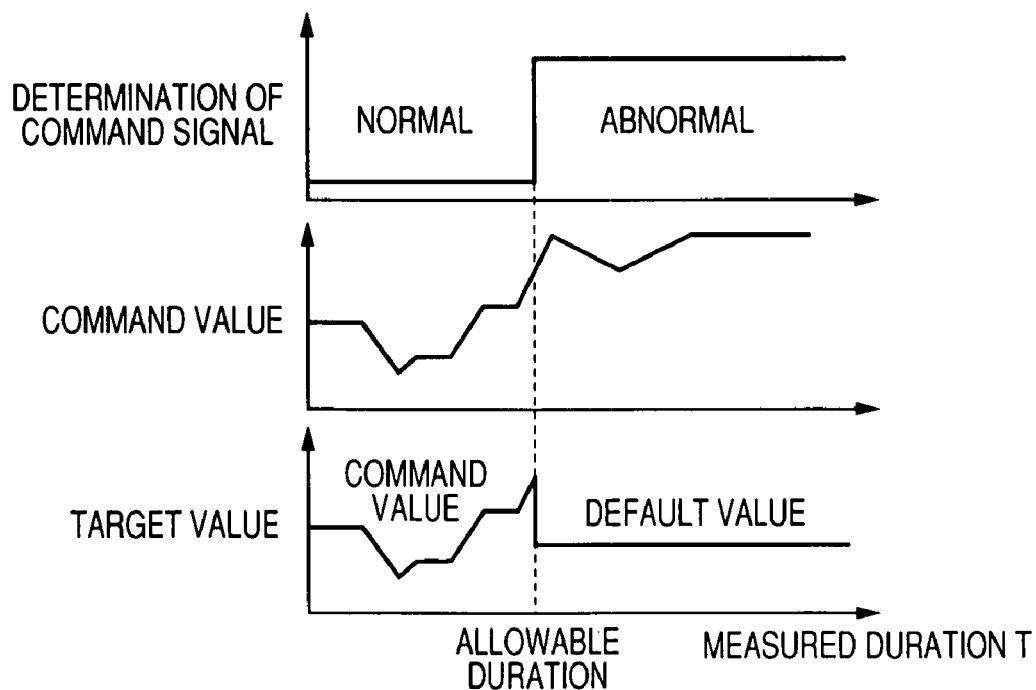
FIG. 6 is a timing chart schematically illustrating a change of a target value to be used to control an alternator output voltage from a command value to a default value according to the embodiment.

Specifically, as illustrated in FIG. 6, when the measured duration T by the counter 36 reaches the determined allowable duration corresponding to at least one command value (first or second command value), a target value used to drive the power transistor 11 is changed from the at least one command value to the default value independently of the at least command value lying within the corresponding proper range.

Thereafter, the transistor control circuit 39 determines whether power generation of the alternator 1 is continued in step S111.

When it is determined that power generation of the alternator 1 is continued (the determination in step S111 is affirmative), the voltage-regulator's execution is returned to step S100, and the operations in steps S100 to S111 described above are repeated until the determination in step S111 is negative.

Otherwise, when it is determined that power generation of the alternator 1 is terminated (the determination in step S111 is negative), the sequence of power-control operations of the voltage regulator 2 in steps S100 to S111 based on the command signal is terminated.

On the other hand, when it is determined that the determination in step S103 is changed to be affirmative before the measured duration by the counter 36 reaches the determined allowable duration corresponding to each of the first and second command values (the determination in step S107 is NO), the voltage-regulator's execution proceeds to step S112.

In step S112, the abnormal command-value determining circuit 37 determines that each of the first and second command values is normal.

Depending on the normal determination, the target value determining circuit 38 determines, as the first and second target values, the first and second command values in step S113.

Next, in step S114, the transistor control circuit 39 drives the power transistor 11 based on the first and second command values as the first and second target values, based on the detected alternator output voltage at the output terminal B, and based on the detected magnitude of the field current flowing through the emitter of the power transistor 11. After completion of the drive of the power transistor 11, the voltage-regulator's execution proceeds to step S111.

Note that, as described above, the sequence of operations illustrated in FIG. 2 is repeated by the voltage regulator 2 each time the command signal sent from the ECU 80 is received thereby. For this reason, after a default value is set as at least one of the first and second target values, when a new command value is sent to the voltage regulator 2, whose measured duration is shorter than a corresponding allowable range, it is possible to rapidly determine, as the at least one of the first and second target values, the new command value.

As described above, the voltage regulator 2 according to the embodiment is configured to, when a failure occurs in a command signal so that a command value contained therein is invariantly sent from the ECU 80 though it should be changed over time depending on the change of the operating conditions of the motor vehicle, detect the failure in the command signal even if the command value lies within a corresponding proper range. This makes it possible to drive the power transistor 11 based on a predetermined default value as a target value so as to stably control the alternator output voltage even in the event of command-signal failure.

The voltage regulator 2 according to the embodiment is configured to determine an allowable duration for each of the various command values respectively corresponding to the various control parameters required to control the alternator output voltage. The allowable durations for the various command values allow the abnormal command-value determining circuit 37 to individually determine whether a failure occurs in the various command signals, making it possible to detect a failure of a command value occurring in a command signal with high accuracy.

The voltage regulator 2 according to the embodiment repeatedly executes the sequence of operations illustrated in FIG. 2 each time the command signal is sent from the ECU 80.

For this reason, after setting a default value as at least one of the first and second target values, when a new command value is sent to the voltage regulator 2 from the ECU 80, whose measured duration is shorter than a corresponding allowable range, the voltage regulator 2 determines, as the at least one of the first and second target values, the new command value. This makes it possible to, when update of a command value is restarted by the new command value, restart control of the alternator output voltage using the new command value. Thus, control of the alternator output voltage based on the command signal sent from the ECU 80 can be executed with high accuracy.

In the embodiment, the voltage regulator 2 is configured to use the characteristic in which each of the command values (target-voltage command value, field-current command value, and duty command value) is changed depending on the change in the vehicle speed as one of the operating conditions of the vehicle (see FIGS. 3 to 5).

As another example, the voltage regulator 2 can be configured to use another characteristic in which each of the command values (target-voltage command value, field-current command value, and duty command value) is changed depending on the change in another one of the operating conditions of the vehicle.

Figure 7:
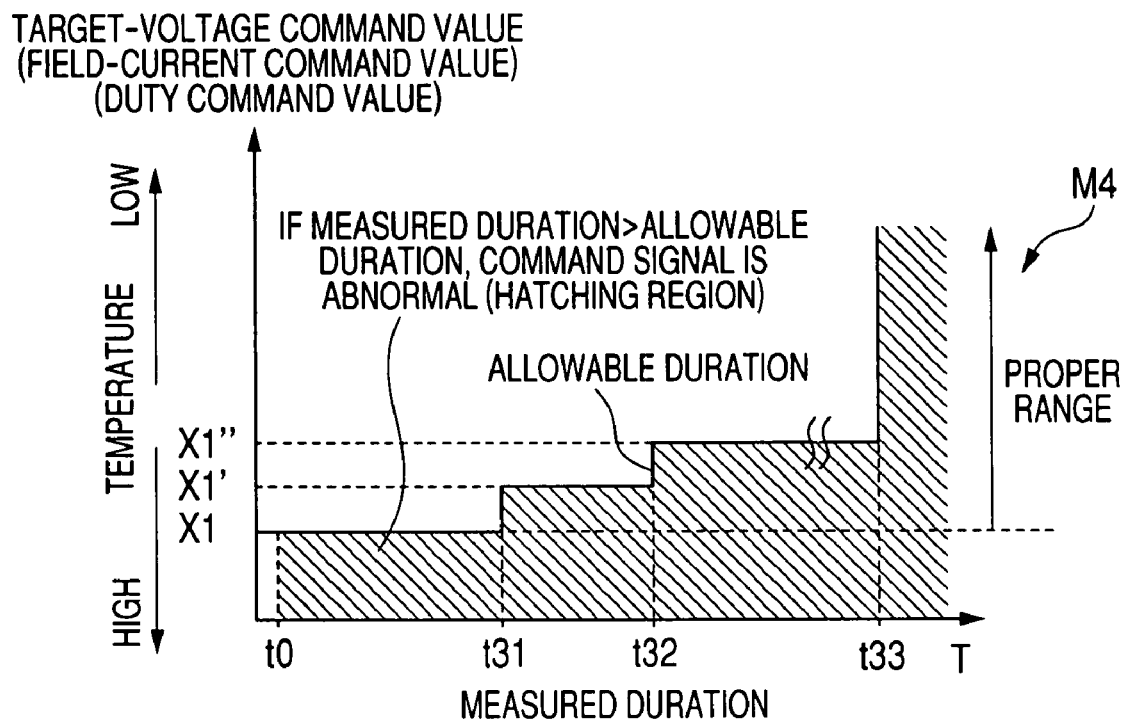
FIG. 7 is a view schematically illustrating a map representing a relationship between a variable indicative of a command value and that indicative of a measured duration corresponding to the command value according to a modification of the embodiment.

For example, FIG. 7 schematically illustrates a fourth map M4 representing the relationship between the variable indicative of a command value (the target-voltage command value, the field-current command value, or the duty command value) within a corresponding proper range and that indicative of a measured duration corresponding to the command value.

As illustrated in FIG. 7, the command value is decreased from a value X1" toward the lowest value X1 corresponding to the lower limit of the proper range via a value X1' with increase of the temperature at the predetermined measurement point located in the alternator 1 measured by the temperature sensor. The decrease in the command value in response to increase in the temperature at the predetermined measurement point located in the alternator 1 allows torque used to generate power by the alternator 1 to be reduced.

In FIG. 7, the allowable duration has been determined depending on the variable of the command value. The allowable duration partitions the region defined by the variable of the measured duration into an abnormal region (hatching region) and a normal region (non-hatching region).

Specifically, as illustrated in FIG. 7, when the measured duration T of the command value of X1' being invariantly received by the command-value detector 33 exceeds the corresponding allowable duration of t31 so that the measured duration T lies within the hatching region, the target-voltage command value of X1' is determined to be abnormal even if it lies within the proper range.

Specifically, the voltage regulator 2 can be configured to use another characteristic in which each of the command values (target-voltage command value, field-current command value, and duty command value) is changed depending on the change in the temperature at the predetermined measurement point located in the alternator 1 (see FIG. 7).

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A control system for controlling a power generator based on a command value associated with a control parameter, the command value being changed over time and included in a command signal externally sent to the control system, the control system comprising:
   a receiver that receives the command signal;
   a detector that detects the command value included in the received command signal;
   a determiner that determines whether a duration of the detected command value being invariant within a predetermined range exceeds a predetermined allowed duration; and
   a controller that controls an output of the power generator based on a predetermined default value within the predetermined range in place of the command value when it is determined that the duration of the detected command value being invariant within the predetermined range exceeds the predetermined allowed duration.

2. A control system according to claim 1, wherein the control parameter is a plurality of control parameters associated with a plurality of the command values, respectively, the duration is a plurality of durations determined for the plurality of command values, respectively, the predetermined range is a plurality of predetermined ranges for the plurality of command values, respectively, the allowed duration is a plurality of allowed durations determined for the plurality of command values, respectively, and the determiner determines whether the plurality of durations of the plurality of command values being invariant within the plurality of proper ranges individually exceed the plurality of allowed durations, respectively.

3. A control system according to claim 1, wherein, under the output of the power-generator being controlled based on the predetermined default value within the predetermined range, when the determiner determines that the duration of the detected command value being invariant within the predetermined range is equal to or lower than the predetermined allowed duration, the controller controls the output of the power-generator based on the command value in place of the default value.

4. A control system according to claim 1, wherein the control system has been installed in a motor vehicle, and the command value associated with the control parameter is changed over time depending on change in an operating condition of the motor vehicle.

5. A control system according to claim 1, wherein the predetermined range for the command value associated with the control parameter is changed with change in the command value over time.

6. A control system installed in a motor vehicle for controlling a power generator based on a command value associated with a control parameter, the command value depending on change in an operating condition of the motor vehicle and included in a command signal externally sent to the control system, the control system comprising:
- a first detector that detects the operating condition of the motor vehicle;
- a receiver that receives the command signal;
- a second detector that detects the command value included in the received command signal;
- a storage unit that has stored therein information, the information representing a relationship between a variable of the command value depending on the change in the operating condition of the motor vehicle and a variable of a predetermined allowed duration; and
- a determiner to determine whether a failure occurs in the command signal based on the operating condition of the motor vehicle and the information stored in the storage unit.

7. A control system according to claim 6, wherein the determiner determines that a failure occurs in the command signal when a duration of the detected command value being invariant within a predetermined range exceeds a value of the variable of the allowed duration, the value of the variable of the allowed duration corresponding to the detected command value in the information stored in the storage unit.

8. A control system according to claim 7, further comprising:
- a controller that controls an output of the power-generator based on a predetermined default value within the predetermined range in place of the command value when it is determined that the duration of the detected command value being invariant within the predetermined range exceeds the value of the variable of the allowed duration.

* * * * *